US009465773B2

(12) United States Patent
Mevissen et al.

(10) Patent No.: US 9,465,773 B2
(45) Date of Patent: Oct. 11, 2016

(54) DATA-DRIVEN DISTRIBUTIONALLY ROBUST OPTIMIZATION

(75) Inventors: Martin Mevissen, Dublin (IE); Emanuele Ragnoli, Dublin (IE); Jia Yuan Yu, Quebec (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 978 days.

(21) Appl. No.: 13/587,980

(22) Filed: Aug. 17, 2012

(65) Prior Publication Data

US 2014/0052408 A1    Feb. 20, 2014

(51) Int. Cl.
*G06F 17/11*    (2006.01)

(52) U.S. Cl.
CPC .................. *G06F 17/11* (2013.01)

(58) Field of Classification Search
CPC ..... G01C 21/16; G01C 22/006; G01C 17/11
USPC .......................................... 702/181
See application file for complete search history.

(56) References Cited

U.S. PATENT DOCUMENTS

| 6,714,899 | B2 | 3/2004 | Kassmann |
| 7,653,522 | B2 * | 1/2010 | Peralta ................ G06F 11/3447 703/2 |
| RE42,440 | E | 6/2011 | Bera et al. |
| 7,996,340 | B2 | 8/2011 | Kashima |
| 2010/0185557 | A1 | 7/2010 | Hunter et al. |
| 2011/0022363 | A1 | 1/2011 | Furman et al. |
| 2011/0082895 | A1 | 4/2011 | Everest |
| 2011/0125702 | A1 | 5/2011 | Gorur Narayana Srinivasa et al. |
| 2011/0307230 | A1 | 12/2011 | Lee et al. |
| 2012/0010919 | A1 * | 1/2012 | Aswal ................... G06Q 10/04 705/7.25 |
| 2012/0035984 | A1 | 2/2012 | Gorur Narayana Srinivasa et al. |

FOREIGN PATENT DOCUMENTS

WO    WO01/55939 A2    8/2011

OTHER PUBLICATIONS

Lasserre, "A Semidefinite Programming Approach to the Generalized Problme of Moments", Feb. 7, 2007, Springer-Verlag p. 65-92.*

(Continued)

*Primary Examiner* — Manuel Rivera Vargas
(74) *Attorney, Agent, or Firm* — Cantor Colburn LLP; Kurt Goudy

(57) ABSTRACT

Embodiments of the disclosure include a system for providing data-driven distributionally robust optimization the system including a processor, the processor configured to perform a method. The method includes receiving a plurality of samples of one or more uncertain parameters for a complex system and calculating a distribution uncertainty set for the one or more uncertain parameters. The method also includes receiving a deterministic problem model associated with the complex system that includes an objective and one or more constraints and creating a distributionally robust counterpart (DRC) model based on the distribution uncertainty set and the deterministic problem model. The method further includes formulating the DRC as a generalized problem of moments (GPM), applying a semi-definite programming (SDP) relaxation to the GPM and generating an approximation for a globally optimal distributionally robust solution to the complex system.

30 Claims, 3 Drawing Sheets

(56) References Cited

OTHER PUBLICATIONS

Feng, et al.; "A Kinship Function Approach to Robust and Probabilistic Optimization Under Polynomial Uncertainty", IEEE Trans. on, vol. 56, Iss. 7, Jul. 2011, pp. 1509-1523.

Paschalidis et al.; "Robust Linear Optimization: On The Benefits of Distributional Information and Application in Inventory Control", 44th IEEE Conference Dec. 12-15, 2005, pp. 4416-4421.

Lasserre, Jean B., "A Semidefinite programming approach to the generalized problem of moments", Feb. 7, 2007, Springer-Verlag, Math. Program., Ser. B (2008) 112; pp. 65-92.

\* cited by examiner

US 9,465,773 B2

DATA-DRIVEN DISTRIBUTIONALLY ROBUST OPTIMIZATION

BACKGROUND

The present invention relates to optimization of complex systems under uncertainty, and more specifically, to data-driven distributionally robust optimization of complex systems.

Many of today's complex systems require decision making that is affected by uncertainty in one or more system parameters, such as usage or demand. Currently, data relating to the uncertain aspects of these systems is periodically collected by one or more sensors or meters. Current robust optimization models only exploit the collected usage data for support information of distributions for the uncertain parameters, which often leads to overly conservative models. Current distributionally robust optimization systems only exploit the observed data to construct distributional uncertainty sets consistent with the first two moments of the observed data and/or handle only restrictive classes of objective functions and constraints. On the other hand, current stochastic optimization models require highly accurate knowledge of distribution of uncertain system parameters.

Furthermore, in large-scale systems characterization of uncertainty of system parameters given based on collected data can be challenging.

Optimization models of complex real-world systems often involve nonlinear functionalities in objective and constraints. However, current distributionally robust optimization models can not take into account broad classes of nonlinearities in objective and constraints.

SUMMARY

Embodiments include a system for providing data-driven distributionally robust optimization the system including a processor, the processor configured to perform a method. The method includes receiving a plurality of samples of one or more uncertain parameters for a complex system, the plurality of samples being described by an unknown distribution, and calculating a distribution uncertainty set for the one or more uncertain parameters. The method also includes receiving a deterministic problem model associated with the complex system that includes an objective and one or more constraints and creating a distributionally robust counterpart (DRC) model based on the distributional uncertainty set and the deterministic problem model. The method further includes formulating the DRC as a generalized problem of moments (GPM), applying a semi-definite programming (SDP) relaxation to the GPM and generating an approximation for a globally optimal distributionally robust solution to the complex system.

Embodiments also include a system for providing data-driven distributionally robust optimization, the system including a complex system having a plurality of sensors configured to monitor one or more parameters of the complex system and a plurality of controls configured to control one or more operational characteristic of the complex system. The system also includes an optimization system operable for receiving the one or more parameters from the plurality of sensors, the optimization system configured to preform a method. The method includes receiving a plurality of samples of one or more uncertain parameters for a complex system, the plurality of samples being described by an unknown distribution, and calculating a distribution uncertainty set for the one or more uncertain parameters. The method also includes receiving a deterministic problem model associated with the complex system that includes an objective and one or more constraints and creating a distributionally robust counterpart (DRC) model based on the distributional uncertainty set and the deterministic problem model. The method further includes formulating the DRC as a generalized problem of moments (GPM), applying a semi-definite programming (SDP) relaxation to the GPM and generating an approximation for a globally optimal distributionally robust solution to the complex system.

Embodiments also include a computer program product for providing data-driven distributionally robust optimization, the computer program product including a computer readable storage medium having computer readable program code embodied therewith. The computer readable program code including computer readable program code configured to perform a method. The method includes receiving a plurality of samples of one or more uncertain parameters for a complex system, the plurality of samples being described by an unknown distribution, and calculating a distribution uncertainty set for the one or more uncertain parameters. The method also includes receiving a deterministic problem model associated with the complex system that includes an objective and one or more constraints and creating a distributionally robust counterpart (DRC) model based on the distributional uncertainty set and the deterministic problem model. The method further includes formulating the DRC as a generalized problem of moments (GPM), applying a semi-definite programming (SDP) relaxation to the GPM and generating an approximation for a globally optimal distributionally robust solution to the complex system.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with exemplary embodiments, an optimization model is provided that is robust with respect to uncertain input data, but not too conservative due to extreme scenarios, and is able to handle a variety of nonlinear objectives and constraints.

In accordance with exemplary embodiments, systems and computer program products for deriving approximations of globally optimal, distributionally robust solutions to optimization problems with parameter uncertainty in the presence of samples of the uncertain parameters are provided. In exemplary embodiments, the system takes into account uncertainty in the input data and employs convex optimization solvers to provide globally optimal distributionally robust solutions for a broad class of models for real-world systems.

Figure 1:
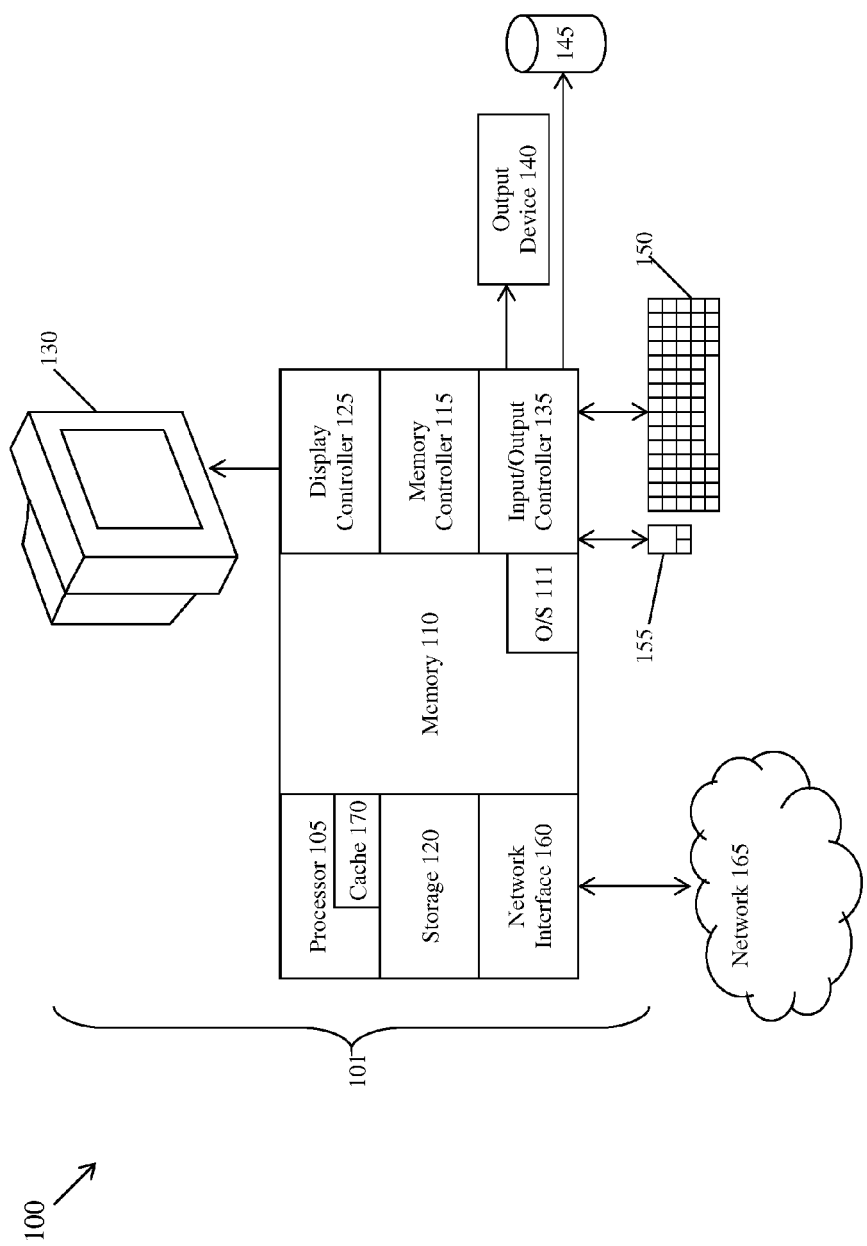
FIG. 1 illustrates a block diagram of a computer system for use in practicing the teachings herein.

FIG. 1 illustrates a block diagram of a computer system 100 for use in practicing the teachings herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. The computer system 100 therefore includes general-purpose computer 101.

In an exemplary embodiment, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing hardware instructions or software, particularly that stored in memory 110 and/or storage 120. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the hardware devices. The BIOS is stored in ROM so that the BIOS can be executed when the computer 101 is activated. When the computer 101 is in operation, the processor 105 is configured to execute instructions stored within the memory 110, to communicate data to and from the memory 110, and to generally control operations of the computer 101 pursuant to the instructions.

In exemplary embodiments, a generalized problem of moments (GPM) with polynomial data is an optimization problem of the form:

$$\min_{\mu \in \mathfrak{M}_+(K)} \quad \int p(x) d\mu(x) \qquad (1)$$

$$\text{s.t.} \quad \int f_i(x) d\mu(x) = b_i, \quad i \in I,$$

$$\int f_j(x) d\mu(x) \le b_i, \quad j \in J,$$

where $K=\{x \in \mathbb{R}^n | g_1(x) \ge 0, \ldots, g_m(x) \ge 0\}$, p, $f_i(i \in I)$, $f_j(j \in J)$ $g_j(j=1, \ldots, m) \in \mathbb{R}[x]$, I,J a finite or infinite set of indices, and $\mathfrak{M}_+(K)$ a set of finite Borel measure supported on K.

The GPM is an infinitely dimensional linear program. It can be approximated by the Lasserre's hierarchy of SDP relaxations:

$$\min_y \quad L_y(p) \qquad (2)$$
$$s.t. \quad M_d(y) \succeq 0,$$
$$M_{d-d_j}(g_j y) \succeq 0, \quad j=1,\ldots,m,$$
$$L_y(f_i) = b_i, \quad i \in I,$$
$$L_y(f_j) \leq b_j, \quad j \in J,$$
$$y_0 \leq Const.,$$

where $$d_j := \left\lceil \frac{deg(g_j)}{2} \right\rceil$$

and $d \in \mathbb{N}$ the order of a single SDP relaxation. Let min (GPM) the minimum of (1), min $(SDP_d)$ the minimum and $y_d^*$ the minimizer of (2). If K compact and its quadratic module archimedian, min $(SDP_d) \to$ min(GPM) for $d \to \infty$. Moreover, if (1) has a unique measure as minimal solution, then $y_d^*$ converges to the moment vector of the optimal measure for (1) as well. In exemplary embodiments, $M_d(y)$ and $M_{d-d_j}(g_j y)$ are linear combinations of the components $y_\alpha$ of y with real-valued, symmetric matrices as multipliers, and $M_d(y) \succeq 0$ stands for a constraint where the matrix $M_d(y)$ is required to be positive semidefinite. In exemplary embodiments $L_y(p)$ is a linear operator that maps a polynomial $P(x) = \Sigma_\alpha P_\alpha x^\alpha$ to a linear combinations of the components $y_\alpha$ of y such that $L_y(p) = \Sigma_\alpha P_\alpha y_\alpha$. Note, if $\mu \in M_+(K)$ is additionally restricted to be a probability measure, the GPM (1) becomes a Polynomial Optimization Problem (POP). Thus, in exemplary embodiments, a POP can be approximated by Lasserre's hierarchy of SDP (2) as well.

In exemplary embodiments when no knowledge of a distribution of a uncertain parameter over the uncertainty set is assumed, the optimization problem can be represented as:

$$\min_{x \in X} \max_{\mu \in \mathfrak{D}} E_{\mu(\xi)}[h(x,\xi)] = \min_{x \in X} \max_{\mu \in \mathfrak{D}} \int_S h(x,\xi) d\mu(\xi) \qquad (3)$$
$$= \min_{x \in X} \max_{\mu \in \mathfrak{D}} F(x,\mu)$$

where $\mathfrak{D}$ some set of finite Borel measures supported on $S \subset \mathbb{R}^m$, as the distributionally robust counterpart (DRC) of the problem:

$$\min_{x \in X} h(x,\xi) \qquad (4)$$

for some given $\xi \in S$. In the data-driven case, $\mathfrak{D}$ is constructed from a given sample $\xi^{(1)}, \ldots, \xi^{(N)}$ of the actual, unknown distribution $\mu^*$ of the uncertain parameter $\xi$.

In exemplary embodiments, an uncertainty set is calculated from a given sample of collected data. In exemplary embodiments, uncertainty sets can be defined by small deviations around the statistical moments. The statistical moments of $\mu^*$ are given by:

$$m_\alpha^N = \frac{1}{N} \sum_{i=1}^{N} (\xi^{(i)})^\alpha,$$

for all $\alpha \in \mathbb{N}^m$. The uncertainty set $\mathfrak{D}_{d,\epsilon,N}$ can be represented as:

$$\mathfrak{D}_{d,\epsilon,N} =$$
$$\left\{ \mu \in \mathfrak{M}_+(S) \;\middle|\; \int_S \xi^\alpha d\mu(\xi) \leq m_\alpha^N + \epsilon_\alpha, \int_S \xi^\alpha d\mu(\xi) \geq m_\alpha^N - \epsilon_\alpha \forall |\alpha| \leq d \right\},$$

for some $d \in \mathbb{N}$ and $\epsilon_\alpha > 0$, where $\mathfrak{M}_+(S)$ the set of finite Borel measures supported on the set S. $\epsilon$ needs to be chosen such that $\mu^* \in \mathfrak{D}$. Furthermore, assuming the support $S := \{\xi | g_j(\xi) \geq 0 \; (j=1,\ldots,r)\}$ of $\mu^*$ where $g_j \in \mathbb{R}[\xi]$ are multivariate real polynomials, is compact, and $h \in \mathbb{R}[x,\xi]$ i.e. a multivariate polynomial in x and $\xi$.

In exemplary embodiments, the distributionally robust counterpart model can be reformulated as generalized problem of moments. Utilizing the dual of the inner maximization problem, (3) can be re-written as:

$$\min_{x \in X, \lambda^+ \leq 0, \lambda^- \leq 0} \sum_\alpha \lambda_\alpha^+ b_\alpha^+ + \sum_\alpha \lambda_\alpha^- b_\alpha^- \qquad (5)$$
$$s.t. \quad \sum_\alpha \lambda_\alpha^+ h_\alpha^+(\xi) + \sum_\alpha \lambda_\alpha^- h_\alpha^-(\xi) \leq h(x,\xi) \forall \xi \in S,$$

where $h_\alpha^+(\xi) := -\xi^\alpha$, $h_\alpha^-(\xi) := \xi^\alpha$, $b_\alpha^+ := -m_\alpha^N - \epsilon_\alpha$ and $b_\alpha^- := m_\alpha^N - \epsilon_\alpha$, i.e. $\int_S h_\alpha^+(\xi) d\mu(\xi) \geq b_\alpha^+$ and $\int_S h_\alpha^-(\xi) d\mu(\xi) \geq b_\alpha^-$ the inequalities in the definition of $\mathfrak{D}_{d,\epsilon,N}$. Assuming $h(x,\xi) := \Sigma_\alpha h_\alpha(\xi) x^\alpha$ where $h_\alpha \in \mathbb{R}[\xi]$. Define $z := (x,\lambda^+,\lambda^-)$ and $Z := X \times \mathbb{R}_-^{2k}$. Then, (5) can be rewritten as:

$$\min_{z \in Z} \sum_\alpha \tilde{b}_\alpha z^\alpha \qquad (6)$$
$$s.t. \quad \left( \sum_\beta \tilde{h}_\beta(\xi) \right) z^\beta \geq 0 \; \forall \xi \in S,$$

where $\tilde{b}$ and $\tilde{h}_\beta$ defined based on b, $h_\alpha^+$, $h_\alpha^-$ and h. Then, the polynomial constraint (6) can be tightened by introducing r matrix variables $A_j$:

$$\min_{z \in Z, A_j \in \mathbb{S}_+^{s(d)}} \sum_\alpha \tilde{b}_\alpha z^\alpha \qquad (7)$$
$$s.t. \quad \sum_\beta \tilde{h}_\beta(\xi) z^\beta = \sum_{j=0}^{r} g_j(\xi) u_d(\xi) A_j u_d(\xi) \quad \forall \xi \in \mathbb{R}^m,$$
$$A_j \succeq 0 \quad \forall j \in \{0,\ldots,r\},$$

where $g_0(\xi) := 1$ and $u_d(\xi) = (1, \xi_1, \ldots, \xi_m^d)$ the standard basis of $\mathbb{R}[\xi]_d$.

The set of polynomial equality constraints in (7) can be rewritten as a set of constraints linear in $z^\beta$ and components of $A_j$. Since each of the constraints $A_j \in \mathbb{S}_+^{s(d)}$ can be written as a finite number of scalar, polynomial inequality constraints, (7) is equivalent to a polynomial optimization problem, which can be approximated by a sequence of semi-definite programming (SDP) relaxations.

In exemplary embodiments, the $\mathfrak{D}$ of (3) is a set of Borel measures defined by their densities with respect to the Lebesgue measure supported on the same set S as before. The statistical estimate for the density of $\mu^*$ based on the sample $\xi^{(1)}, \ldots, \xi^{(N)}$ can be denote by $f^N \in L^2(S)$. Any one of numerous known methods including, but not limited to, Kernel Density Estimation or wavelets, can be used to estimate densities of an unknown measure given a finite sample. In exemplary embodiments, $f^N$ is a multivariate polynomial, in order to guarantee the set $\mathfrak{D}_{d,\epsilon,N}$ constructed below is nonempty when d is fixed.

In an exemplary embodiment, the uncertainty set may be represented as:

$$\mathfrak{D}_{\epsilon,N} = \{\mu \in \mathfrak{M}_+(S) | \int_S d\mu(\xi) = \int_S f(\xi)d\xi, \int_S (f(\xi) - f^N(\xi))^2 d\xi \leq \epsilon\}.$$

In order to derive tractable distributionally robust counterpart model (DRC), we consider the following truncated, polynomial approximation for $D_{\epsilon,N}$:

$$\mathfrak{D}_{d,\epsilon,N} = \{f \in \mathbb{R}[\xi]_d | f(\xi) \geq 0 \, \forall \xi \in S, \int_S (f(\xi) - f^N(\xi))^2 d\xi \leq \epsilon\}, \quad (8)$$

i.e. the inner maximization problem is equivalent to:

$$\max_{f \in \mathbb{R}[\xi]_d} \sum_\alpha x^\alpha \int_S h_\alpha(\xi) f(\xi) d\xi \quad (9)$$

$$\text{s.t.} \quad f(\xi) \geq 0 \quad \forall \xi \in S,$$

$$\int_S (f(\xi) - f^N(\xi))^2 d\xi \leq \epsilon.$$

For a fixed $x \in X$, (9) is a polynomial optimization problem. Its dual is a minimization problem involving polynomials, moment expressions and the closed, semialgebraic set S as well. Therefore, the DRC (3) can be reformulated as a minimization problem involving moments and polynomials, which can be approximated by a converging sequence of SDP relaxations.

In another exemplary embodiment, the uncertainty set may be represented as:

$$\mathfrak{D}_{\epsilon,N} = \{\mu \in \mathfrak{M}_+(S) | \int_S d\mu(\xi) = \int_S f(\xi)d\xi, \max_{\xi \in S} |f(\xi) - f^N(\xi)| \leq \epsilon\}.$$

In order to derive tractable DRC, $\mathfrak{D}_{\epsilon,N}$ can be approximated as:

$$\mathfrak{D}_{d,\epsilon,N} = \{f \in \mathbb{R}[\xi]_d | f(\xi) \geq 0 \, \forall \xi \in S, \max_{\xi \in S} |f(\xi) - f^N(\xi)| \leq \epsilon\}, \quad (10)$$

i.e. the inner maximization problem is equivalent to:

$$\max_{f \in \mathbb{R}[\xi]_d} \sum_\alpha x^\alpha \int_S h_\alpha(\xi) f(\xi) d\xi \quad (11)$$

$$\text{s.t.} \quad f(\xi) \geq 0 \quad \forall \xi \in S,$$

$$-f(\xi) + f^N(\xi) - \epsilon \geq 0 \quad \forall \xi \in S,$$

$$f(\xi) - f^N(\xi) + \epsilon \geq 0 \quad \forall \xi \in S.$$

With $f(\xi) = \Sigma_\beta f_\beta \xi^\beta$, (11) can be rewritten as:

$$\max_{(f_\beta)_\beta \in \mathbb{R}^q} \sum_\beta f_\beta h_\beta(x) \quad (12)$$

$$\text{s.t.} \quad -\sum_\beta f_\beta \xi^\beta \geq 0 \quad \forall \xi \in S,$$

$$\sum_\beta f_\beta \xi^\beta \leq f^N(\xi) - \epsilon \quad \forall \xi \in S,$$

$$-\sum_\beta f_\beta \xi^\beta \leq -f^N(\xi) + \epsilon \quad \forall \xi \in S,$$

where $h_\beta(x) := \Sigma_\alpha x^\alpha h_{\alpha,\beta} := \Sigma_\alpha x^\alpha \int_S h_\alpha(\xi) \xi^\beta d\xi$. Taking the dual of (12), we are able to reformulate the min-max problem (3) as the minimization problem:

$$\min_{\substack{x \in X, \\ \mu_1 \in \mathfrak{M}_+(S), \\ \mu_2 \in \mathfrak{M}_+(S), \\ \mu_3 \in \mathfrak{M}_+(S)}} \int_S 0 d\mu_1(\xi) + \quad (13)$$

$$\int_S f^N(\xi) - \epsilon d\mu_2(\xi) + \int_S -f^N(\xi) + \epsilon d\mu_3(\xi)$$

$$\text{s.t.} -\int_S \xi^\beta d\mu_1(\xi) + \int_S \xi^\beta d\mu_2(\xi) - \int_S \xi^\beta d\mu_3(\xi) = h_\beta(x) \forall \beta.$$

Assuming $X := \{x | k_j(x) \geq 0, j=1, \ldots, t\}$ compact, where $k_j \in \mathbb{R}[x]$. (13) is equivalent to:

$$\min_{\substack{v \in \mathfrak{M}_+(X), \\ \mu_1 \in \mathfrak{M}_+(S), \\ \mu_2 \in \mathfrak{M}_+(S), \\ \mu_3 \in \mathfrak{M}_+(S)}} \int_S 0 d\mu_1(\xi) + \int_S f^N(\xi) - \epsilon d\mu_2(\xi) + \int_S -f^N(\xi) + \epsilon d\mu_3(\xi) \quad (14)$$

$$\text{s.t.} -\int_S \xi^\beta d\mu_1(\xi) + \int_S \xi^\beta d\mu_2(\xi) - \int_S \xi^\beta d\mu_3(\xi) = \int_S h_\beta(x) dv(x) \forall \beta,$$

$$\int_X dv(x) = 1.$$

Problem (14) is a Generalized Problem of Moments (GPM) with polynomial data, whose minimum can be approximated up to arbitrary precision by a hierarchy of SDP relaxations, if X and S are compact and archimedian. Moreover, in the case (14) has a unique minimizer, the sequence of optimal solutions of the hierarchy of SDPs converges to this minimizer for increasing relaxation order.

In exemplary embodiments, it can be assumed that samples $\xi^{(1)}, \ldots, \xi^{(N)}$ for the uncertain parameter $\xi$, which takes values in a given bounded interval $[A, B] \subset \mathbb{R}$, which can be broken into K-intervals:

$$u_0, \ldots, u_{K-1},$$

such that:

$$|u_k| = |B - A|/K \text{ for all } k = 0, \ldots, K-1.$$

Let $m_0, \ldots, m_{K-1}$ denote the midpoints of the respective intervals, the empirical distribution $\hat{F}_{N,K}$ can be defined as:

$$\hat{F}_{N,K}(k) = \frac{1}{N} \sum_{i=1}^N 1_{[\xi^{(i)} \in u_k]} \text{ for all } k = 0, \ldots, K-1.$$

In exemplary embodiments, the uncertainty set may be approximated by the following optimization problem:

$$\min_{x \in X} \max_{y \in U_\epsilon} \int_{\xi \in S} h(x, \xi) \gamma(\xi) d\xi, \quad (15)$$

where:

$$U_\epsilon = \left\{ \gamma : [A, B] \to \mathbb{R}_+ : \int \gamma(\xi) d\xi = 1, \right.$$

$$\left|\gamma(z) - \sum_{k=1}^{K} \hat{F}_{N,K}(k)1_{[z \in u_k]}\right| \leq \varepsilon \text{ for all } z\right\}.$$

Let $d=(d_1, \ldots, d_K)$ denote a vector in $\mathbb{R}^K$. The optimization problem (15) can be approximated by the following:

$$\min_{x \in X} \max_{d \in W_\varepsilon} \Sigma_{k=0}^{K-1} h(x, m_k) d_k, \quad (16)$$

where the uncertainty set is:

$$W_\varepsilon = \left\{d \in \Delta^K : |d_k - \hat{F}_{N,K}(k)| \leq \varepsilon \frac{B-A}{K} \text{ for all } k\right\}$$

In exemplary embodiments, the optimization problem can be reformulated as a polynomial optimization problem. Observe that the inner maximization of (16) can be written as:

$$max_{d \in \mathbb{R}^K} \sum_{k=0}^{K-1} h(x, m_k) d_k \quad (M1)$$

s.t. $d_k - \hat{F}_{N,K}(k) \leq \varepsilon$, $k = 0, \ldots, K-1$;

$\hat{F}_{N,K}(k) - d_k \leq \varepsilon$, $k = 0, \ldots, K-1$;

$$\sum_{i=1}^{K} d_i \leq 1;$$

$d_j \geq 0$, $j = 0, \ldots, K-1$.

The dual of the maximization (M1) is:

$$\min_{y \in \mathbb{R}^{2K+1}} \sum_{k=0}^{K-1} y_k(\varepsilon + \hat{F}_{N,K}(k)) + \sum_{\ell=K}^{2K-1} y_\ell(\varepsilon - \hat{F}_{N,K}(\ell - K)) + y_{2K}$$

s.t. $y_k - y_{K+k} + y_{2K} \geq h(x, m_k)$, $k = 0, \ldots, K-1$, $y_j \geq 0$, $j = 0, \ldots, 2K$.

By the Duality Theorem for linear programs, the primal and dual have the same optimal value; hence, the optimization (16) can be written as:

$$\min_{x \in X, y \in \mathbb{R}^{2K+1}} \sum_{k=0}^{K-1} y_k(\varepsilon + \hat{F}_{N,K}(k)) + \sum_{\ell=K}^{2K-1} y_\ell(\varepsilon - \hat{F}_{N,K}(\ell - K)) + y_{2K} \quad (A1)$$

s.t. $y_k - y_{K+k} + y_{2K} \geq h(x, m_k)$, $k = 0, \ldots, K-1$, $y_j \geq 0$, $j = 0, \ldots, 2K$.

(A1) is a polynomial optimization problem (POP) of dimension $n+2K+1$, its degree coincides with the degree of h.

If h is a multivariate polynomial in the arguments x and $\xi$, then the optimization problem:

$$\min_{x \in X} \max_{d \in W_\varepsilon} \Sigma_{k=0}^{K-1} h(x, m_k) d_k, \quad (17)$$

can be approximated by a sequence of SDP relaxations.

In exemplary embodiments, $\xi$ denotes the uncertain parameter, which is a random variable takes values in a set $S \triangleq [A, B]^d \subseteq \mathbb{R}^d$ and $\xi^{(1)}, \ldots, \xi^{(N)}$ denotes a sequence of random variables with the same probability distribution as $\xi$. The set can be partitioned $[A, B]^d$ into a regular grid of $K^d$ hypercubes of equal volume:

$$\{v_a : a \in [K]^d\}$$

Letting $m_a$ denote the center of the hypercube $v_a$ for every a, the partition of [A,B] can be defined as K intervals of equal length:

$$u_0, \ldots, u_{K-1}.$$

$\xi_l^{(i)}$ denotes the l-th component of the sample $\xi^{(i)}$, for every i, and every pair $l \neq l'$, the random variables $\xi_l^{(i)}$ and $\xi_{l'}^{(i)}$ are independent. If N and K are fixed; the marginal empirical frequencies $\hat{F}_l$ can be defined as:

$$\hat{F}_\ell(k) = \frac{1}{N} \sum_{i=1}^{N} 1_{[\xi_\ell^{(i)} \in u_k]} \text{ for all}$$

$k = 0, \ldots, K-1$, and $\ell = 1, \ldots, d$.

Let $a_1, \ldots, a_d$ denote the components of $a \in [K]^d$. The joint empirical frequencies can be defined as:

$$\hat{G}(a) = \prod_{\ell=1}^{d} \hat{F}_\ell(a_\ell) \text{ for all}$$

$a \in [K]^d$.

Consider the robust optimization problem with an uncertainty set centered on the empirical density:

$$\min_{x \in X} \max_{\gamma \in U_\varepsilon} \int_{\xi \in S} h(x, \xi) \gamma(\xi) d\xi, \quad (18)$$

where:

$U_\varepsilon =$ $$\left\{\gamma : S \to \mathbb{R}_+ : \int \gamma(z) dz = 1, \left|\gamma(z) - \sum_{a \in [K]^d} \hat{G}(a) 1_{[z \in v_a]}\right| \leq \varepsilon \text{ for all } z\right\}.$$

The optimization problem (18) can be approximated by the following:

$$\min_{x \in X} \max_{p \in W_\varepsilon} \Sigma_{a \in [K]^d} h(x, m_a) p(a), \quad (19)$$

where the uncertainty set is:

$$W_\varepsilon = \{p : [K]^d \to \mathbb{R}_+ : \Sigma_a p(a) \leq 1, |p(a) - \hat{G}(a)| \leq \varepsilon \text{ for all } a\}.$$

In exemplary embodiments, the optimization problem can be reformulated as a polynomial optimization problem. The inner maximization of (19) can be written as:

$$\min_x \max_p \sum_{a \in [K]^d} h(x, m_a) p(a) \qquad (M2)$$

s.t. $p(a) - \hat{G}(a) \le \varepsilon,$ $\forall a \in [K]^d;$ $\hat{G}(a) - p(a) \le \varepsilon,$ $\forall a \in [K]^d;$ $\sum_{a \in [K]^d} p(a) \le 1;$ $p(a) \ge 0,$ $\forall a \in [K]^d.$ The dual of the maximization (M2) is:

$$\min_x \min_{y, y', y''} \sum_{a \in [K]^d} y_a(\varepsilon + \hat{G}(a)) + \sum_{a' \in [K]^d} y'_{a'}(\varepsilon - \hat{G}(a')) + y''$$

s.t. $y_a - y'_a + y'' \ge h(x, m_a),$ $\forall a \in [K]^d,$ $y_a \ge 0,$ $y'_a \ge 0,$ $y'' \ge 0,$ $\forall a \in [K]^d.$ By the Duality Theorem for linear programs, the primal and dual have the same optimal value.

Figure 2:
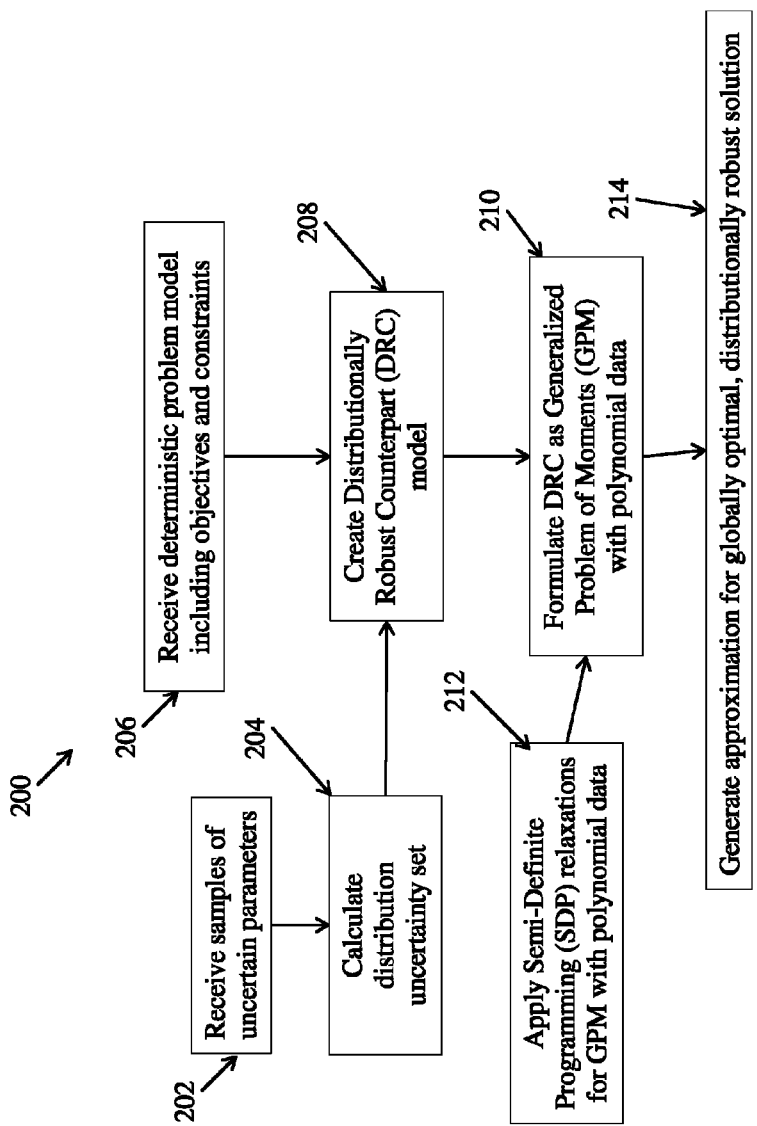
FIG. 2 illustrates a flow diagram of a method for providing data-driven distributionally robust optimization in accordance with an embodiment.

Referring now to FIG. 2, a flow diagram illustrating a method 200 for providing data-driven distributionally robust optimization in accordance with an embodiment is shown. As shown at block 202, the method 200 includes receiving sample of uncertain parameters for a system. In exemplary embodiments, the samples may be received from one or more sensors or meters in the system. Next, as shown at block 204, the method includes calculating a distribution uncertainty set using statistical tools based on polynomial probability density functions, moments up to arbitrary order or histogram estimates. In exemplary embodiments, the distributional uncertainty set may be described by polynomial inequality constraints. As shown at block 206, the method 200 also includes receiving a deterministic problem model that includes one objective and one or more constraints. In exemplary embodiments, the objective and the equality and inequality constraints may be described as multivariate real-valued polynomials. As shown at block 208, the method 200 includes creating a distributionally robust counterpart (DRC) model based on the distributional uncertainty set and the deterministic problem model. Next, as shown at block 210, the method 200 includes formulating the DRC as a Generalized Problem of Moments (GPM) with polynomial data. As shown at block 212, a Semi-Definite Programing (SDP) relaxation is applied to the GPM. The method 200 concludes at block 214 by generating an approximation for distributionally robust solution.

In exemplary embodiments, the approximation for distributionally robust solution includes a precision level that can be evaluated after the approximation for distributionally robust solution is created. In exemplary embodiments, the distributional uncertainty set includes a support that is described by one or more multivariate polynomial inequality constraints.

Figure 3:
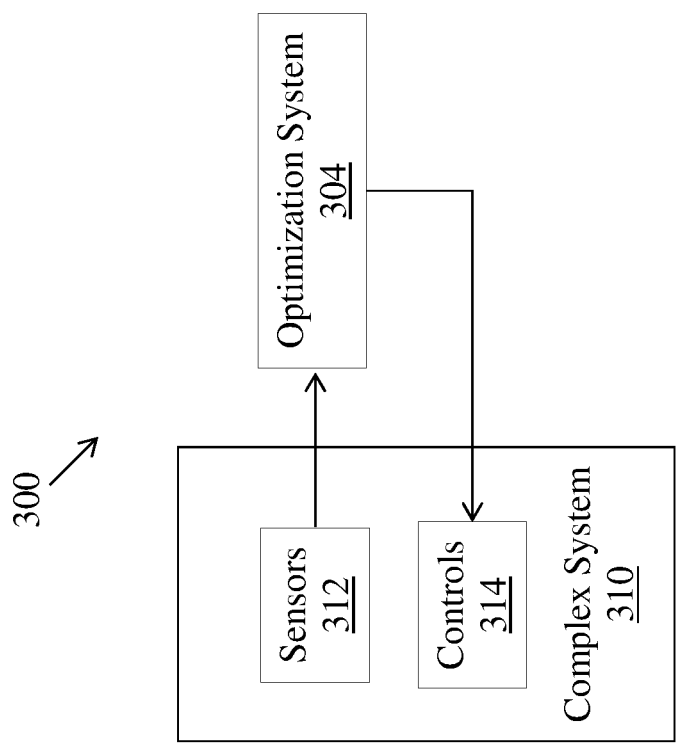
FIG. 3 illustrates a block diagram of a system for providing data-driven distributionally robust optimization in accordance with an embodiment.

Referring now to FIG. 3, a block diagram of a system 300 for providing data-driven distributionally robust optimization is shown. As illustrated the system 300 includes a complex system 310 and an optimization system 304, which may be a computer system similar to the one shown in FIG. 1. The complex system 310 includes one or more sensors 312 that are configured to monitor the operation of one or more parameters of the complex system 310. In addition, the complex system 310 includes one or more controls 314 that are configured to control one or more operational characteristic of the complex system. In exemplary embodiments, the optimization system 304 receives data samples from the one or more sensors 312 and calculates an approximation for distributionally robust solution. Based on the approximation for distributionally robust solution, the controls 314 of the complex system 310 are configured to optimize the operation of the complex system 310.

In an exemplary embodiment, the complex system 310 may be a water distribution network characterized by a connected graph G(N, E), representing a water distribution network. Where N is the set of nodes and E the set of pipes connecting the nodes. In addition, $p_i$ the pressure, $e_i$ elevation, and $d_i$ demand at $i \in N$, $q_{i,j}$ the flow from i to j, and $hl_{i,j}$ the headloss caused by friction in case of flow i to j for $(i,j) \in E$. The optimization goal is to minimize the overall pressure in the water distribution network while adhering to the mass and energy conservations laws for flow and pressure:

$$\min \sum_{i \in N} p_i + \sum_{j \in N} \left( d_j - \sum_{k \ne j} q_{k,j} + \sum_{l \ne j} q_{j,l} \right)^2 \qquad (20)$$

s.t. $p_{min} \le p_i \le p_{max} \forall i \in N,$ $q_{min} \le q_{i,j} \le q_{max} \forall (i, j) \in E,$ $q_{i,j}(p_j + e_j - p_i - e_i + hl_{i,j}(q_{i,j})) \le 0 \forall (i,j) \in E,$ $p_j + e_j - p_i - e_i + hl_{i,j}(q_{i,j}) \ge 0,$ $\forall (i, j) \in E.$ Assuming the headloss, $hl_{i,j}$, is a quadratic function in q and the vector of demands $d=(d_1, \ldots, d_{|N|})$ is not known exactly and is therefore affected by uncertainty. Given a sample $d^{(1)}, \ldots, d^{(K)}$ of measurements of the demands at K discrete, equidistant time points.

Letting $p=(p_1, \ldots, p_{|N|}) \in \mathbb{R}^{|N|}$ and $q=(q_{1,2}, q_{2,1}, \ldots,) \in \mathbb{R}^{2|E|}$ and defining $h(p,q,d) := \sum_{i \in N} p_i + \sum_{j \in N}(d_j - \sum_{k \ne j} q_{k,j} + \sum_{l \ne j} q_{j,l})^2$, $X := \{(p,q) \in \mathbb{R}^{|N|+2|E|} | p_{min} \le p_i \le p_{max} \forall i, q_{min} \le q_{i,j} \le q_{max}, q_{i,j}(p_j+e_j-p_i-e_i+hl_{i,j}) \le 0, p_j+e_j-p_i-e_i+hl_{i,j}(q_{i,j}) \ge 0 \forall (i,j)\}$. (20) is then equivalent to:

$$\min_{(p,q) \in X} h(p,q,d) \qquad (21)$$

for a given demand profile d, i.e. it is of the form (4). In addition to the sampled demand, lower and upper bounds for demand at each node are given. Therefore, $d \in S := \{\tilde{d} \in \mathbb{R}^{|N|} | d_i^{min} \le \tilde{d}_i \le d_i^{max}\}.$ The uncertainty set can be defined as:

$$\mathcal{D}_{t,\varepsilon,K} = \{f \in \mathbb{R}_{[d]_t} | f(d) \ge 0 \forall d \in S, \max_{d \in S} |f(d) - f^K(d)| \le \varepsilon\}. \qquad (22)$$

The distributionally robust counterpart of (20) can be represented as:

$$\min_{(p,q)\in X} \max_{f\in \mathcal{D}_{t,\in,K}} \int_S h(p, q, d) f(d) dd,$$

i.e. it falls into the class (3).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer system for providing data-driven distributionally robust optimization for a water distribution network, the computer system comprising:
   a processor, the processor configured to perform a method comprising:
   receiving, from one or more physical sensors in the water distribution network, a plurality of samples of one or more uncertain parameters for the water distribution network, wherein the one or more uncertain parameters include one of a usage and a demand in the water distribution network;
   calculating a distribution uncertainty set for the one or more uncertain parameters based on the plurality of samples, wherein the plurality of samples are described by an unknown distribution;
   receiving a deterministic problem model associated with the water distribution network that includes an objective and one or more constraints, wherein the objective is to minimize an overall pressure in the water distribution network and wherein the one or more constraints comprise at least a head loss;
   creating a distributionally robust counterpart (DRC) model based on the distribution uncertainty set and the deterministic problem model;
   formulating the DRC as a generalized problem of moments (GPM);
   applying a semi-definite programming (SDP) relaxation to the GPM;
   generating an approximation for a globally optimal distributionally robust solution to the water distribution network that satisfies the objective and the one or more constraints; and
   configuring one or more controls configured to control operational characteristic of the water distribution network utilizing the approximation for the globally optimal distributionally robust solution, wherein the overall pressure in the water distribution network is minimized.

2. The computer system of claim 1, wherein calculating the distribution uncertainty set for the one or more uncertain parameters is based on a polynomial estimate of a probability density function.

3. The computer system of claim 1, wherein formulating the DRC as the GPM comprises:
   calculating a dual minimization problem of an inner maximization problem;
   transforming a feasible set of an inner minimization problem to match a structure of the feasible set of an outer minimization problem; and
   reducing a minimization-minimization problem to a minimization problem, which constitutes the GPM.

4. The computer system of claim 1, wherein formulating the DRC as the GPM comprises: calculating a dual-maximization problem of an inner minimization problem,
   transforming a feasible set of an inner maximization problem to match the structure of the feasible set of an outer maximization problem; and
   reducing a maximization-maximization problem to a maximization problem, which constitutes the GPM.

5. The computer system of claim 1, wherein calculating the distribution uncertainty set for the one or more uncertain parameters is based on statistical estimates for a plurality of moments of the unknown distribution of the uncertain system parameters up to an arbitrary order.

6. The computer system of claim 1, wherein calculating the distribution uncertainty set for the one or more uncertain parameters is based on histogram estimates for the unknown distribution of the uncertain system parameters.

7. The computer system of claim 1, wherein the distribution uncertainty set includes a support that is described by one or more multivariate polynomial inequality constraints.

8. The computer system of claim 1, wherein the objective is described as multivariate polynomial.

9. The computer system of claim 1, wherein the objective and the one or more constraints are described as multivariate polynomials.

10. The computer system of claim 1, wherein the approximation for a distributionally robust solution includes precision level.

11. A computer system for providing data-driven distributionally robust optimization for a water distribution network, the computer system comprising:
   the water distribution network comprising:
      a plurality of physical sensors configured to monitor one or more parameters of the water distribution network, wherein the one or more uncertain parameters include one of a usage and a demand in the water distribution network; and
      a plurality of controls configured to control one or more operational characteristic of the water distribution network;
   a optimization system operable for receiving the one or more parameters from the plurality of physical sensors, the optimization system configured to perform a method comprising:
      receiving a plurality of samples of the one or more parameters from the plurality of physical sensors, wherein the plurality of samples is described by an unknown distribution;
      calculating a distribution uncertainty set for the one or more parameters;

receiving a deterministic problem model associated with the water distribution network that includes an objective and one or more constraints, wherein the objective is to minimize an overall pressure in the water distribution network and wherein the one or more constraints comprise at least a head loss;

creating a distributionally robust counterpart (DRC) model based on the distribution uncertainty set and the deterministic problem model;

formulating the DRC as a generalized problem of moments (GPM);

applying a semi-definite programming (SDP) relaxation to the GPM;

generating an approximation for a globally optimal distributionally robust solution to the water distribution network that satisfies the objective and the one or more constraints; and configure one or more controls configured to control operational characteristic of the water distribution network utilizing the approximation for the globally optimal distributionally robust solution, wherein the overall pressure in the water distribution network is minimized.

12. The computer system of claim 11, wherein formulating the DRC as the GPM comprises:

calculating a dual minimization problem of an inner maximization problem;

transforming a feasible set of an inner minimization problem to match a structure of the feasible set of an outer minimization problem; and reducing a minimization-minimization problem to a minimization problem, which constitutes the GPM.

13. The computer system of claim 11, wherein formulating the DRC as the GPM comprises: calculating a dual-maximization problem of an inner minimization problem, transforming a feasible set of an inner maximization problem to match the structure of the feasible set of an outer maximization problem; and reducing a maximization-maximization problem to a maximization problem, which constitutes the GPM.

14. The computer system of claim 11, wherein calculating the distribution uncertainty set for the one or more uncertain parameters is based on a polynomial estimate of a probability density function.

15. The computer system of claim 11, wherein calculating the distribution uncertainty set for the one or more uncertain parameters is based on statistical estimates for a plurality of moments of the unknown distribution of the uncertain system parameters up to an arbitrary order.

16. The computer system of claim 11, wherein calculating the distribution uncertainty set for the one or more uncertain parameters is based on histogram estimates for the unknown distribution of the uncertain system parameters.

17. The computer system of claim 11, wherein the distribution uncertainty set includes a support that is described by one or more multivariate polynomial inequality constraints.

18. The computer system of claim 11, wherein the objective is described as multivariate polynomial.

19. The computer system of claim 11, wherein the objective and the one or more constraints are described as multivariate polynomials.

20. The computer system of claim 11, wherein the approximation for a distributionally robust solution includes precision level.

21. A computer program product for providing data-driven distributionally robust optimization for a water distribution network, the computer program product comprising:

a computer readable storage medium having computer readable program code embodied therewith, the computer readable program code comprising:

computer readable program code configured for:

receiving from one or more physical sensors in the water distribution network a plurality of samples of one or more uncertain parameters for the water distribution network, wherein the plurality of samples is described by an unknown distribution;

calculating a distribution uncertainty set for the one or more uncertain parameters based on the plurality of samples, wherein the one or more uncertain parameters include one of a usage and a demand in the water distribution network;

receiving a deterministic problem model associated with the water distribution network that includes an objective and one or more constraints, wherein the objective is to minimize an overall pressure in the water distribution network and wherein the one or more constraints comprise at least a head loss;

creating a distributionally robust counterpart (DRC) model based on the distribution uncertainty set and the deterministic problem model;

formulating the DRC as a generalized problem of moments (GPM);

applying a semi-definite programming (SDP) relaxation to the GPM;

generating an approximation for a globally optimal distributionally robust solution to the water distribution network that satisfies the objective and the one or more constraints; and configuring one or more controls configured to control operational characteristic of the water distribution network utilizing the approximation for the globally optimal distributionally robust solution, wherein the overall pressure in the water distribution network is minimized.

22. The computer program product of claim 21, wherein formulating the DRC as the GPM comprises:

calculating a dual minimization problem of an inner maximization problem;

transforming a feasible set of an inner minimization problem to match a structure of the feasible set of an outer minimization problem; and reducing a minimization-minimization problem to a minimization problem, which constitutes the GPM.

23. The computer program product of claim 21, wherein formulating the DRC as the GPM comprises: calculating a dual-maximization problem of an inner minimization problem, transforming a feasible set of an inner maximization problem to match the structure of the feasible set of an outer maximization problem; and reducing a maximization-maximization problem to a maximization problem, which constitutes the GPM.

24. The computer program product of claim 21, wherein calculating the distribution uncertainty set for the one or more uncertain parameters is based on a polynomial estimate of a probability density function.

25. The computer program product of claim 21, wherein calculating the distribution uncertainty set for the one or more uncertain parameters is based on statistical estimates for a plurality of moments of the unknown distribution of the uncertain system parameters up to an arbitrary order.

26. The computer program product of claim 21, wherein calculating the distribution uncertainty set for the one or more uncertain parameters is based on histogram estimates for the unknown distribution of the uncertain system parameters.

27. The computer program product of claim 21, wherein the distribution uncertainty set includes a support that is described by one or more multivariate polynomial inequality constraints.

28. The computer program product of claim 21, wherein the objective is described as multivariate polynomial.

29. The computer program product of claim 21, wherein the objective and the one or more constraints are described as multivariate polynomials.

30. The computer program product of claim 21, wherein the approximation for a distributionally robust solution includes precision level.

* * * * *